United States Patent [19]

Jabarin

[11] Patent Number: 5,011,720

[45] Date of Patent: Apr. 30, 1991

[54] MULTILAYER CONTAINERS AND METHOD OF MAKING SAME

[75] Inventor: Saleh A. Jabarin, Holland, Ohio

[73] Assignee: Owens-Illinois Plastic Products Inc., Toledo, Ohio

[21] Appl. No.: 377,392

[22] Filed: Jul. 10, 1989

[51] Int. Cl.$^5$ .............................................. B65D 25/00
[52] U.S. Cl. ................................ 428/36.6; 428/474.9; 428/520
[58] Field of Search ...................... 428/36.6, 36.7, 520, 428/474.9

[56] References Cited

U.S. PATENT DOCUMENTS

| | | | |
|---|---|---|---|
| 4,254,169 | 3/1981 | Schroeder | 428/36.6 |
| 4,511,610 | 4/1985 | Yazaki et al. | 428/36.6 |
| 4,883,696 | 11/1989 | Iwanami et al. | 428/36.6 |
| 4,894,291 | 1/1990 | Ofstein | 428/520 |
| 4,904,512 | 2/1990 | Yamada et al. | 428/36.6 |

*Primary Examiner*—James J. Seidleck

[57] ABSTRACT

A plastic container having a plastic wall that includes two plastic layers bonded together without a separate adhesive layer, the two layers being a barrier layer and a support layer, the support layer being a blend of a polyolefin, a polymer having a polar group and a barrier polymer.

10 Claims, No Drawings

MULTILAYER CONTAINERS AND METHOD OF MAKING SAME

The present invention relates to multilayer containers containing at least two layers bonded together without an adhesive. The invention also relates to method of making the containers without using an adhesive layer between the two walls of the containers.

BACKGROUND OF THE INVENTION

In the art, the usual method of making multilayer containers for food and chemical packaging involves bonding two walls of the containers together with a separate adhesive layer. Thus, an adhesive layer is normally used to bond a high barrier layer such as nylon or a copolymer of ethylene and vinyl acetate to a plastic support layer of a polyolefin such as polyethylene or polypropylene or copolymers of ethylene and propylene.

The resulting structure has an extra layer with extra cost and, for production, requires using a multilayer die head design.

It is desirable to provide a multilayer container having two walls which are bonded together without a separate adhesive layer between the layers.

OBJECTS OF THE INVENTION

It is an object of the present invention to provide a multilayer plastic container having at least two plastic layers that are bonded together without using an extra separate adhesive layer between the walls.

It is an object of the present invention to provide a plastic container having two plastic walls (a support layer that is a polyolefin and a barrier layer such as nylon) without using a separate layer and without the use of a multilayer die head design.

These and other objects will be apparent from the specification that follows and the appended claims.

SUMMARY OF THE INVENTION

Broadly stated, the present invention provides a plastic container having at least two walls bonded together without a separate adhesive layer, the one layer being a support layer that is a blend of a polyolefin and a polymer having a polar group (preferably a polymer containing the residue of maleic anhydride such as a maleic anhydride functionalized block copolymer of polystyrene and poly (ethylene/butylene), and the other layer being a barrier layer such as polyamide or a copolymer of ethylene and vinyl alcohol.

The present invention provides a multilayer plastic container and a method of making the same, the container having multilayer walls having two plastic walls or layers bonded together without a separate adhesive layer, one layer being a support layer that is a blend of (A) a polyolefin, (B) a polymer with a polar group and (C) an ethylene/vinyl alcohol copolymer the other layer being a barrier layer that is a copolymer of ethylene and vinyl alcohol.

The present invention also provides a plastic multiwall container with two plastic walls or layers bonded together without a separate adhesive layer, the container comprising:

1. a polyolefin support layer, the support layer being a blend of
   (A) polyolefin,
   (B) a polymer with a polar group,
   (C) a polyamide, and
2. a polyamide barrier layer.

The present invention provides for a method of making the previously described multilayer plastic containers.

DETAILED DESCRIPTION

In the present invention, the multilayer process is simplified by modifying polyolefin support layer polymers such as polyethylenes, polypropylene and ethylene-propylene copolymers by adding another polymer containing a polar group so that a direct bonding to the barrier layer, e.g., amorphous or crystalline polyamide, or ethylene-vinyl alcohol copolymer, is achieved without the use of a separate adhesive layer. Polar polymers contain groups such as carboxylic, hydroxyl, amide, imide, ester, and acetalic. Suitable polymers with polar groups are copolymers of ethylene or propylene with vinyl alcohol or vinyl acetate or ethylene acrylate. A preferred polymer is made from maleic anhydride such as a maleic anhydride functionalized block copolymer polystyrene and polyethylene/butylene (or butadiene).

The following examples illustrate the invention.

EXAMPLE 1

High density polyethylene (HDPE), a polar group containing polymer (an 85/15 copolymer of ethylene and vinyl acetate), and a polyamide were mixed together in a single screw Brabender mixer in the ratio of 80:10:10. A sheet of such blend was pressed in a laboratory scale Carver Press at 450° F. This sheet was then put in contact with a sheet of polyamide alone in the press at 450° F. and 25-30 psi for 2-4 minutes followed by quenching. In a control experiment, a sheet of HDPE and a sheet of polyamide were kept in the press under similar conditions. No adhesion was found between the sheet of HDPE and polyamide while the sheet of the above described blend could not be pulled apart from the sheet of polyamide.

EXAMPLE 2

In another experiment, one gallon containers were blown on a ML-4 blow molding machine with a gallon mold at 450° F., with above described blend as the outside layer and polyamide as the inside layer. A good adhesion between these layers is observed.

Excellent results were obtained when polypropylene was used in place of polyethylene in the above Examples. Also good results were obtained when an ethylene/vinyl alcohol copolymer was used in place of the polyamide in the support layer and in the barrier layer.

EXAMPLE 3

Sheets were made as described in Example 1 except that Kraton G FG 1901X thermoplastic rubber was used in place of the copolymer of ethylene and vinyl acetate. Substantial equivalent results were obtained when the polyamide in the blend was omitted and a blend of 90 HDPE, 10 Kraton FG rubber used.

In the present invention, the polyolefin support layer is a polymer of an olefin having two to four carbon atoms. The preferred polyolefin is polyethylene or polypropylene. The polyethylene can be high density, low density, or linear low density polyethylene with high density polyethylene being preferred. Copolymers of ethylene and propylene are very useful, such copolymers containing about 80 or 85 up to 95 weight percent ethylene or propylene. Suitable polyethylenes, polypropylene and propylene based polymers are set forth in Jabarin U.S. Pat. No. 4,605,576 which is incorporated by reference.

Suitable barrier polymers include polyvinylidene chloride and nitrile polymers although polyamides and an ethylene/vinyl alcohol copolymer (5 to 25 weight percent vinyl alcohol) are highly preferred.

Suitable polyamides are nylon, copolymers of adipic acid hexamethylene diamine (6, 6-nylon), and copolymers of adipic acid and polycaprolactam.

Suitable polar polymers are copolymers of ethylene, propylene, butylene, with monomers containing polar groups (carboxylic, hydroxyl, amide, imide, ester, acetalic), such as vinyl acetate, alkyl (methyl, ethyl) acrylate, trimellitic anhydride, caprolactone, caprolactam, vinyl alcohol, adipic acid, maleic acid or maleic anhydride, sebacic acid, glycerol, propane diol, and other polar group containing monomers that are generally 2 or 5 up to 20 or 25 weight percent of the total copolymer and preferably 5 or 10 up to 15 or 18 weight percent.

Kraton FG 1901X Rubber is described in Shell Chemical Company Technical Bulletin SC: 592-87. As described therein, the rubber generally has about 2 weight percent of bond maleic anhydride therein. The Bulletin is incorporated by reference.

The bond maleic anhydride, or other polar group in the polymer can be about ½ to 10 or 20 weight percent, the preferred functionality being about 1 or 2 to 5 or 8 weight percent.

What is claimed is:

1. A container having a wall with at least two layers bonded together without a separate adhesive layer, one layer being a support layer that is a blend of a polyolefin and a polymer having a polar group that is a maleic anhydride functionalized block copolymer of styrene and ethylene/butylene, and the other layer being a barrier layer that is a polyamide or an ethylene/vinyl alcohol copolymer.

2. A container as defined in claim 1 in which the barrier layer is a polyamide.

3. A container as defined in claim 1 in which the polyolefin is polyethylene or polypropylene, the barrier polymer is polyamide and polyamide is also included in the blend in the support layer.

4. A container as defined in claim 1 in which the barrier layer is an ethylene/vinyl alcohol copolymer.

5. A container as defined in claim 1 which is blow molded and in which the wall has two layers only.

6. A hollow, blow molded container having a wall with two layers bonded together without a separate adhesive layer, one layer being a polymer blend of (A) a polyolefin, (B) a polymer having a polar group, and (C) a polyamide; and the other layer being a polyamide the wall consisting essentially of the two layers.

7. A container as defined in claim 6 in which the polymer blend has about 60 to 90 weight percent polyolefin, about 5 to 20 weight percent of a polymer having a polar group, and about 5 to 20 weight percent of a polyamide.

8. A hollow blow molded container having a wall consisting essentially of two layers bonded together without a separate adhesive layer, one layer being a polymer blend of (A) a polyolefin, (B) a polymer with a polar group, and (C) an ethylene/vinyl alcohol copolymer to form a support layer; and the other layer being an ethylene/vinyl alcohol copolymer to form a barrier layer that is on the outside of the wall.

9. A hollow, blow molded container having a wall with two layers bonded together without a separate adhesive layer, one layer being a polymer blend of (A) high density polyethylene, (B) polyethylene vinyl acetate, and (C) nylon and the other layer being a nylon, the container wall consisting of the two layers with the nylon layer on the outside of the wall.

10. A blow molded container having a wall with two layers bonded together without a separate adhesive layer, the layers comprising (1) a support layer that is a blend of (A) a polyolefin, (B) a polymer with a polar group, (C) a barrier polymer that is a polyamide or an ethylene/vinyl alcohol copolymer; and (2) a barrier layer that is a polyamide or an ethylene/vinyl alcohol copolymer, the container wall consisting of the support layer and the barrier layer.

* * * * *